United States Patent
Gurevich et al.

(10) Patent No.: US 8,266,532 B2
(45) Date of Patent: Sep. 11, 2012

(54) DEVICE AND METHOD FOR TAGGING CONNECTING COMPONENTS

(75) Inventors: Vladimir Gurevich, Stony Brook, NY (US); Vitaly Polikoff, Rye, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1329 days.

(21) Appl. No.: 11/863,983

(22) Filed: Sep. 28, 2007

(65) Prior Publication Data
US 2009/0089691 A1 Apr. 2, 2009

(51) Int. Cl.
*G06F 3/00* (2006.01)
(52) U.S. Cl. ........ 715/743; 715/734; 715/823; 715/735; 715/762; 715/810
(58) Field of Classification Search .................. 715/743, 715/734, 823, 735, 762, 810; 235/462.01
See application file for complete search history.

(56) References Cited

U.S. PATENT DOCUMENTS

| | | | |
|---|---|---|---|
| 6,388,688 B1 * | 5/2002 | Schileru-Key | 715/854 |
| 6,813,749 B2 * | 11/2004 | Rassaian | 703/7 |
| 6,880,127 B1 * | 4/2005 | Arquie | 715/735 |
| 7,185,286 B2 * | 2/2007 | Zondervan et al. | 715/762 |
| 7,246,045 B1 * | 7/2007 | Rappaport et al. | 703/2 |
| 7,263,680 B2 * | 8/2007 | Drapeau | 716/126 |
| 7,290,218 B2 * | 10/2007 | Hawkins | 715/810 |
| 7,966,363 B2 * | 6/2011 | Boehm et al. | 709/201 |
| 2004/0061701 A1 * | 4/2004 | Arquie et al. | 345/440 |
| 2007/0136709 A1 * | 6/2007 | Rodman | 716/8 |
| 2007/0139191 A1 * | 6/2007 | Quatro | 340/539.13 |

* cited by examiner

Primary Examiner — Michael Roswell

(57) ABSTRACT

A method tags connecting components. The method comprises capturing an image of a plurality of grid sections. The image of each of the grid sections includes at least one connector disposed therein. The at least one connector has a first end in a first one of the grid sections and a second end in a second one of the grid sections. The method comprises displaying a first virtual identifier in the image of the first grid section for the first end of the connector. The method comprises displaying a second virtual identifier in the image of the second grid section for the second end of the connector.

17 Claims, 5 Drawing Sheets

DEVICE AND METHOD FOR TAGGING CONNECTING COMPONENTS

FIELD OF THE INVENTION

The present invention relates generally to a device and method for tagging connecting components. Specifically, with complicated systems involved in an information technology capacity, a connector is virtually marked to aid in determining ends of the connector.

BACKGROUND

An information technology system may include a large amount of components. For example, a phone or computer server room may include many servers that connect to other components, other servers, etc. A wiring involved between the components of the system may become increasingly more complicated as further components are added, connections between the components increase, etc. The wires may run directly between the components aboveground or may run under the floor, in the ceiling, in cable trays, etc. The system may also be relatively large, requiring wires that span up to hundreds of feet.

When troubleshooting the system, it may be difficult to identify each component, in particular the wiring. Thus, conventionally, old wires that are damaged or no longer needed are abandoned and new wires are placed in the old wires' stead, instead of performing a time consuming troubleshooting task. This may further complicate the system for future troubleshooting matters. With a high volume of new wires being added, available space may also become an issue. For troubleshooting, identifying ends of wires and components may require, for example, barcodes attached at each end of the wire or component. Three dimensional images may also be used for troubleshooting. However, these methods are highly inefficient as they are time-consuming and may be ineffective.

SUMMARY OF THE INVENTION

The present invention relates to a device and method for tagging connecting components. The method comprises capturing an image of a plurality of grid sections. The image of each of the grid sections includes at least one connector disposed therein. The at least one connector has a first end in a first one of the grid sections and a second end in a second one of the grid sections. The method comprises displaying a first virtual identifier in the image of the first grid section for the first end of the connector. The method comprises displaying a second virtual identifier in the image of the second grid section for the second end of the connector.

DETAILED DESCRIPTION

Figure 1:
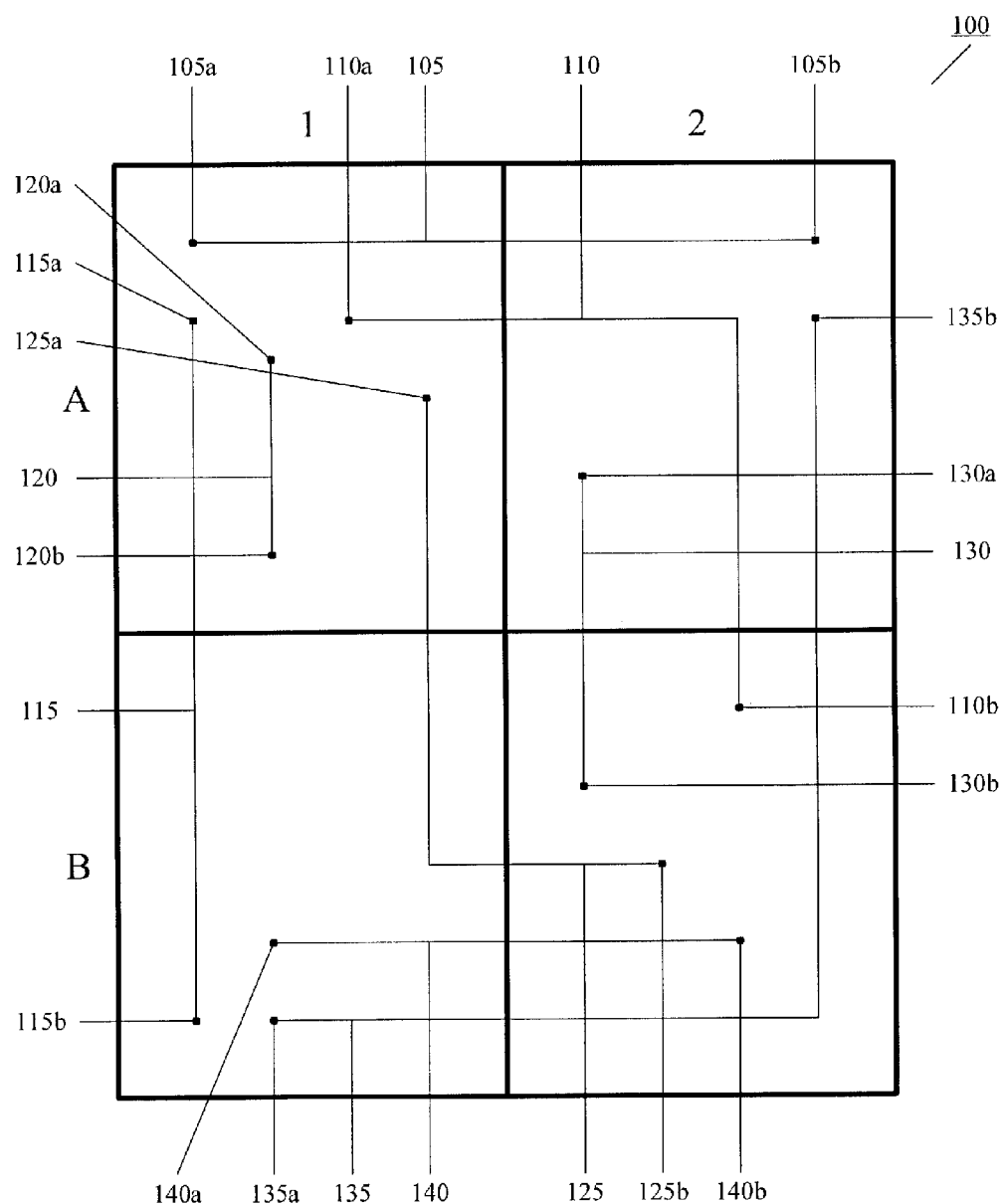
FIG. 1 shows a first system of wires according to an exemplary embodiment of the present invention.

The exemplary embodiments of the present invention may be further understood with reference to the following description and the appended drawings, wherein like elements are referred to with the same reference numerals. The exemplary embodiments of the present invention describe a device and method for tagging connecting components. Specifically, the exemplary embodiments of the present invention create a virtual survey of wires used in an information technology environment. The survey includes data related to the wires such as a beginning/end, a use for the wire, etc. The wires, the survey, and the associated methods will be discussed in more detail below. It should be noted that while the exemplary embodiments are described with reference to a virtual survey of an information technology environment, the present invention may also be used to create virtual surveys of other types of systems having connectors that span a large area such as a power distribution system (power cables), a plumbing system (pipes), etc.

FIG. 1 shows a first system 100 of wires according to an exemplary embodiment of the present invention. The first system 100 may be any information technology system that includes a plurality of components in which a plurality of wires is disposed. For example, the first system 100 may be for a phone server room or a computer server room. The wires may connect the plurality of components with each other (i.e., intrasystem wires) or may connect the plurality of components to further systems (i.e., intersystem wires). It should be noted that the first system 100 may relate generally to any room in which electronic components are disposed so that wires may be used to connect the components to each other.

According to the exemplary embodiments of the present invention, the first system 100 may be divided into a grid. The first system 100 includes a 2×2 grid with four grid sections: A1, A2, B1, and B2. The first system 100 further includes a plurality of wires 105-140. Each wire 105-140 includes first ends denoted 105a-140a and second ends denoted 105b-140b, respectively. The first system may include additional components (not shown). For example, the first system 100 may include a plurality of servers (e.g., for a phone system, a computer system, etc.) disposed throughout an area of the first system 100. The first system 100 may also include other components such as network components (e.g., a network management arrangement, a switch, etc.). Thus, the wires 105-140 may be used to connect the components of the first system 100 with each other.

It should be noted that the first system 100 may represent the wires 105-140 as being disposed above a floor, underneath a floor, in a ceiling, in a cable tray, etc. of a room housing the first system 100. That is, in a first embodiment, each of the wires 105-140 may run from a first component to a second component across the floor, across a ceiling, along a wall, etc. In a second embodiment, each of the wires 105-140 may run from the first component to a second component under the floor of the room. In a third embodiment, the wires 105-140 may run above and/or below the floor. It should also be noted that the use of four sections for the grid of the first system 100 is only exemplary. As will be explained in further detail below with reference to FIG. 2, the system may include a grid that has fewer or more than four sections. It should be noted that the grid may utilize different shapes for grid sections (e.g., triangles, circles, etc.) and the area in which the first system 100 is disposed may be other shapes (e.g., circular, L-shaped, octagonal, etc.).

As discussed above, the wire 105 may include the first end 105*a* and the second end 105*b*. As illustrated, the first end 105*a* of the wire 105 may be in grid section A1 while the second end 105*b* of the wire 105 may be in grid section A2. For example, a server may be disposed in grid section A1 and a switch may be disposed in grid section A2. Thus, the wire 105 may be used to connect the server to the switch.

The wire 110 may include the first end 110*a* and the second end 11*b*. As illustrated, the first end 110*a* of the wire 110 may be in grid section A1, run through grid section A2, so that the second end 110*b* of the wire 110 may be in grid section B2. The wire 115 may include the first end 115*a* and the second end 115*b*. As illustrated, the first end 115*a* of the wire 115 may be in grid section A1 while the second end 115*b* of the wire 115 may be in grid section B1. The wire 120 may include the first end 120*a* and the second end 120*b*. As illustrated, the first end 120*a* and the second end 12*b* of the wire 120 may be in grid section A1. The wire 120 represents that a wire may be wholly disposed in one section of the grid for the first system 100. The wire 125 may include the first end 125*a* and the second end 125*b*. As illustrated, the first end 125*a* of the wire 125 may be in grid section A1, run through grid section B1, so that the second end 125*b* of the wire 125 may be in grid section B2. The wire 130 may include the first end 130*a* and the second end 130*b*. As illustrated, the first end 130*a* of the wire 130 may be in grid section A2 while the second end 130*b* of the wire 130 may be in grid section B2. The wire 135 may include the first end 135*a* and the second end 135*b*. As illustrated, the first end 135*a* of the wire 135 may be in grid section A2, run through grid section B2, so that the second end 135*b* of the wire 135 may be in grid section A2. The wire 140 may include the first end 140*a* and the second end 140*b*. As illustrated, the first end 140*a* of the wire 140 may be in grid section B1 while the second end 140*b* of the wire 140 may be in grid section B2.

The grid sections A1, A2, B1, B2 may be an arbitrary division of an area of the first system 100. That is, if the first system 100 is disposed in a 100 sq. ft. area, then each section may encompass 25% of the total area or 25 sq. ft. In another exemplary embodiment, the grid sections A1, A2, B1, B2 may correspond to a component of the first system 100. For example, the grid section A1 may indicate a first server; the grid section A2 may indicate a first switch; the grid section B1 may indicate a second server; and the grid section B2 may indicate a second switch. Thus, the wires 105, 110, 115, 120, and 125 may include a first end connected to the first server. In a first example, the first end 105*a* of the wire 105 may be plugged into a port of the first server while the second end 105*b* of the wire 105 may be plugged into a port of the first switch. As will be described in greater detail below, the size of each grid may depend on a resolution of an imager that is used to survey the system 100.

According to the exemplary embodiments of the present invention, a virtual survey may be created for the first system 100. Each section of the grid may be marked with an identifier. The identifier may be, for example, a barcode (e.g., one-dimensional, two-dimensional, color barcode, etc.), a radio frequency identification (RFID), etc. That is, a physical identifier is disposed within each grid section. An image of each section of the grid may subsequently be taken so that the wires included in the section may be identified. For example, the image of grid section A1 may include the wires 105, 110, 115, 120, and 125. The image may be of a high resolution so that a distinction may be made of relatively small components such as the wires 105-140. The size of the grid sections may be small enough so that the image is of a proper resolution.

Using the image of each grid section, each wire included in the grid section may be marked with an identifier. The identifier may be a virtual tag. The virtual tag may be manually assigned as a callout with a number drawn on the image. In another embodiment, the wires of the grid section may be automatically found and the virtual tag may be assigned appropriately. The image may be stored with the virtual tags of each wire of the grid section. Furthermore, additional information relating to each wire may be entered and saved to a file coupled to the image or as part of the image. The additional information may be, for example, a use for the wire, a length of the wire, an installation date of the wire, a size of the wire, a connecting point of the wire (e.g., switch 1, port 1), etc. A substantially similar process may be done to the second ends of the wires so that the location of the first and second ends may be known. Because some wires may pass through certain grid sections with no terminals located therein, the additional information may also include the path that the wire takes to get from the grid section with the first end to the grid section with the second end. For example, wire 125 may include additional information stating that the first end 125*a* is disposed in grid section A1, passes through grid section B1, and the second end 125*b* is disposed in grid section B2.

As discussed above, each wire may include a virtual tag to identify the wire in the grid section. In a first embodiment, the virtual tag may be specific to the wire. That is, the virtual tag may be assigned to the first and second ends of the wire. Thus, when the virtual tag for a first end of the wire is read, an identical virtual tag is used to identify a second end of the wire. Furthermore, for wires that pass through a grid section (i.e., no terminals of the wire exist in the grid section), a body of the wire may be marked with the same virtual tag. In a second embodiment, the virtual tag may be specific to an end of the wire. That is, a first virtual tag may be assigned to only the first end of the wire. Thus, a second virtual tag may be assigned to only the second end of the wire. When the first and second virtual tags are stored in, for example, a database, the first virtual tag may be associated with the second virtual tag. That is, any reference to the first virtual tag may also reference the second virtual tag. A body of the wire may be marked with a third virtual tag where the third virtual tag is associated with the first and second virtual tags for the wire. In a third embodiment, a combination of the first and second embodiments may be used. For example, a first virtual tag may be used for the first and second ends of the wire while a second virtual tag is used for the body of the wire. The first and second virtual tags may be associated with each other.

Figure 5:
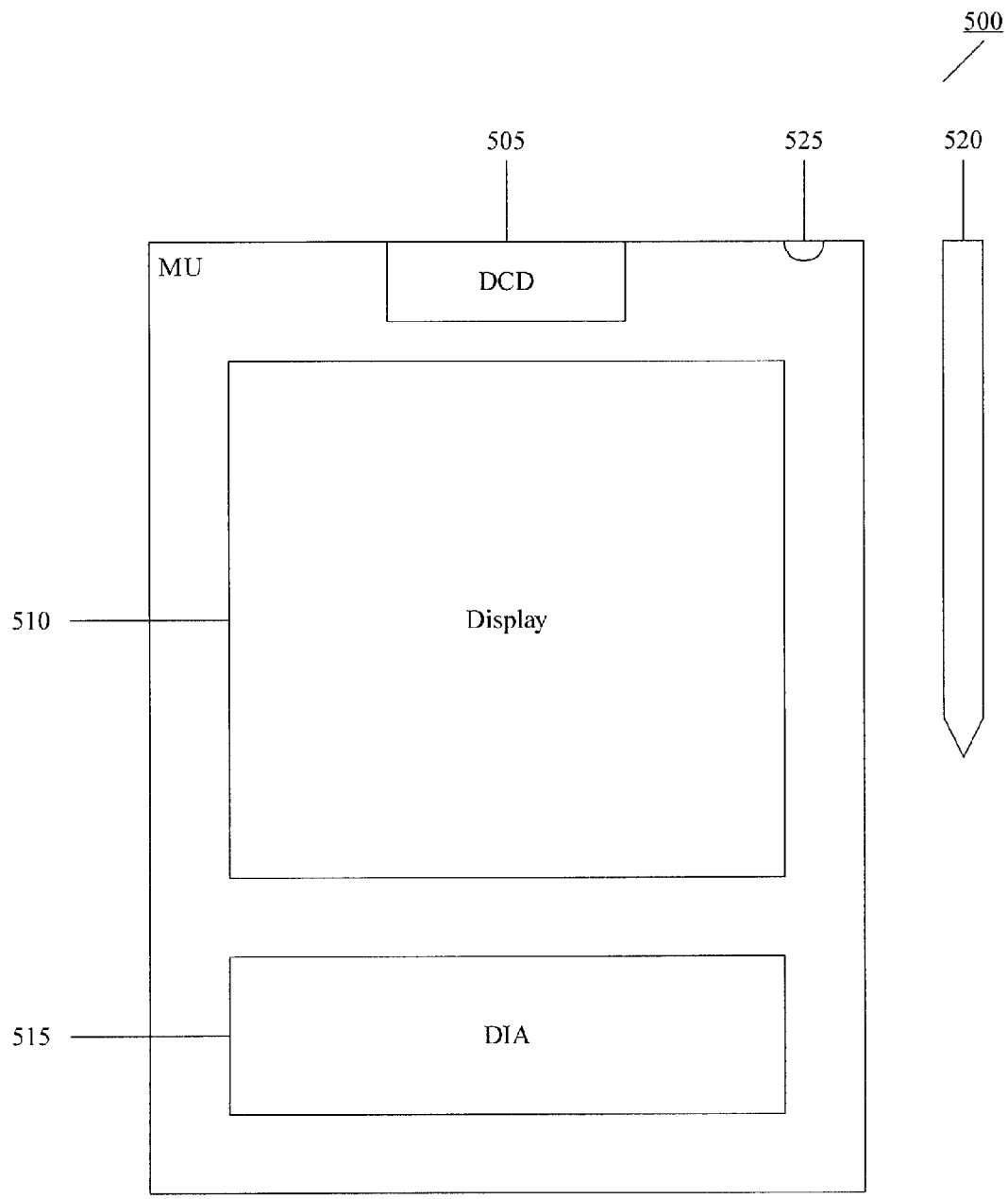
FIG. 5 shows a mobile unit according to an exemplary embodiment of the present invention.

As discussed above, a virtual survey may be created using a variety of different devices. For example, a mobile unit (MU) may be used. FIG. 5 shows an exemplary MU 500 that may be used to survey the first system 100 according to an exemplary embodiment of the present invention. The MU 500 may include, for example, a data capturing device 505, a display 510, a data input arrangement 515, a memory, a stylus 520, a stylus receptacle 525, and a processor. A plurality of MUs 500 may be used with the first system 100. That is, the plurality of MUs 500 may also be devices for internal maintenance (e.g., troubleshooting) of the first system 100. The plurality of MUs 500 may be also be equipped with network components such as a transceiver to exchange data with a central database. Thus, when the MU 500 creates a virtual survey for a portion of the first system 100, the virtual survey may be stored in the central database. Furthermore, additional portions may be saved on the central database. When a full virtual survey of the entire first system 100 is created and stored in the central database, each MU 500 may be equipped with the virtual survey. Utilizing the central database may ensure that no overlap of data occurs such as having a plurality of different virtual tags for a single wire in a grid section. However, it should be noted that the plurality of MUs 500 may be tailored to a single user so that each MU 500 creates an individual virtual survey of the first system 100 (e.g., store virtual survey data in the memory of the MU 500). Other data relating to the virtual survey (e.g., additional data for a wire) may also be stored in the database, the memory, or a combination thereof.

For example, there may be a first database storing the images from each of the grid sections. A second database may store the information for each wire including a relationship to the first database for each image in which a particular wire is present. The second database may also store the additional information including the purpose of the wire, the color, the connection information, etc. Those skilled in the art will understand that the above is only exemplary and there may be other manners of storing the virtual survey data in other types of database storage structures or non-database storage structures (e.g., tables, lists, arrays, etc.).

The data capturing device 505 may be a color camera, a scanner, an imager, an RFID device, etc. As discussed above, each grid section may be marked with an identifier such as a barcode. It should be noted that the identifier may be physically placed in the grid (e.g., a bar code label placed on a floor panel) or on a representation of the grid (e.g., a floor plan of the space may include the identifier for each grid location). Thus, the data capturing device 505 may be used to read the identifier for each grid section. In addition, as discussed above, an image is taken for each grid section. Thus, the data capturing device 505 may also be used to create the image for each grid section. Accordingly, the data capturing device 505 may be a high resolution camera. In a preferred embodiment, the camera is a color camera as the wires may include insulating material covering the metallic conductors that are colored. It should be noted that the data capturing device 505 may be equipped with an aiming system so that a proper image is taken.

The display 510 may show a user data relating to functionalities being executed by the MU. In particular, the display 510 may show the high resolution image of each grid section. Accordingly, the display 510 may be a high resolution flat panel display (FPD). Furthermore, when the data capturing device 505 is used to create a color image, the display 510 may be a color display. The display 510 may be equipped with a digitizer. The digitizer may be, for example, a touch panel to enable a user to use contact inputs to enter data. The digitizer may allow a user to directly touch an image of a grid section on the display 510 to mark a wire with an identifier. The digitizer may also be used as the data input arrangement. For example, the stylus 520 may be removed from the stylus receptacle 525 so that a user may contact the digitizer with the stylus 520. With the stylus 520, the user may also manually draw the wires, set data regarding to the wires, create the virtual tag for a wire, etc. It should be noted that the MU may include a separate data input arrangement 515 such as a keypad. Furthermore, the data input arrangement 515 may include a pointing device such as a mouse or touch panel. In this exemplary embodiment, the pointing device may be used to select a wire to mark it with an identifier.

It should be noted that the MU 500 may be equipped with further components. For example, the MU 500 may include a barcode generating device. The barcode generating device may print a barcode on an adhesive medium to be placed accordingly at a grid section. In another example, the MU 500 may include a memory such as a high-capacity removable memory. The memory may be high-capacity because the images taken with the data capturing device may be of a high-resolution that occupies a relatively large amount of space. The memory may be removable so that data stored thereon may be conveniently moved to a central database or to a different MU.

Figure 2:
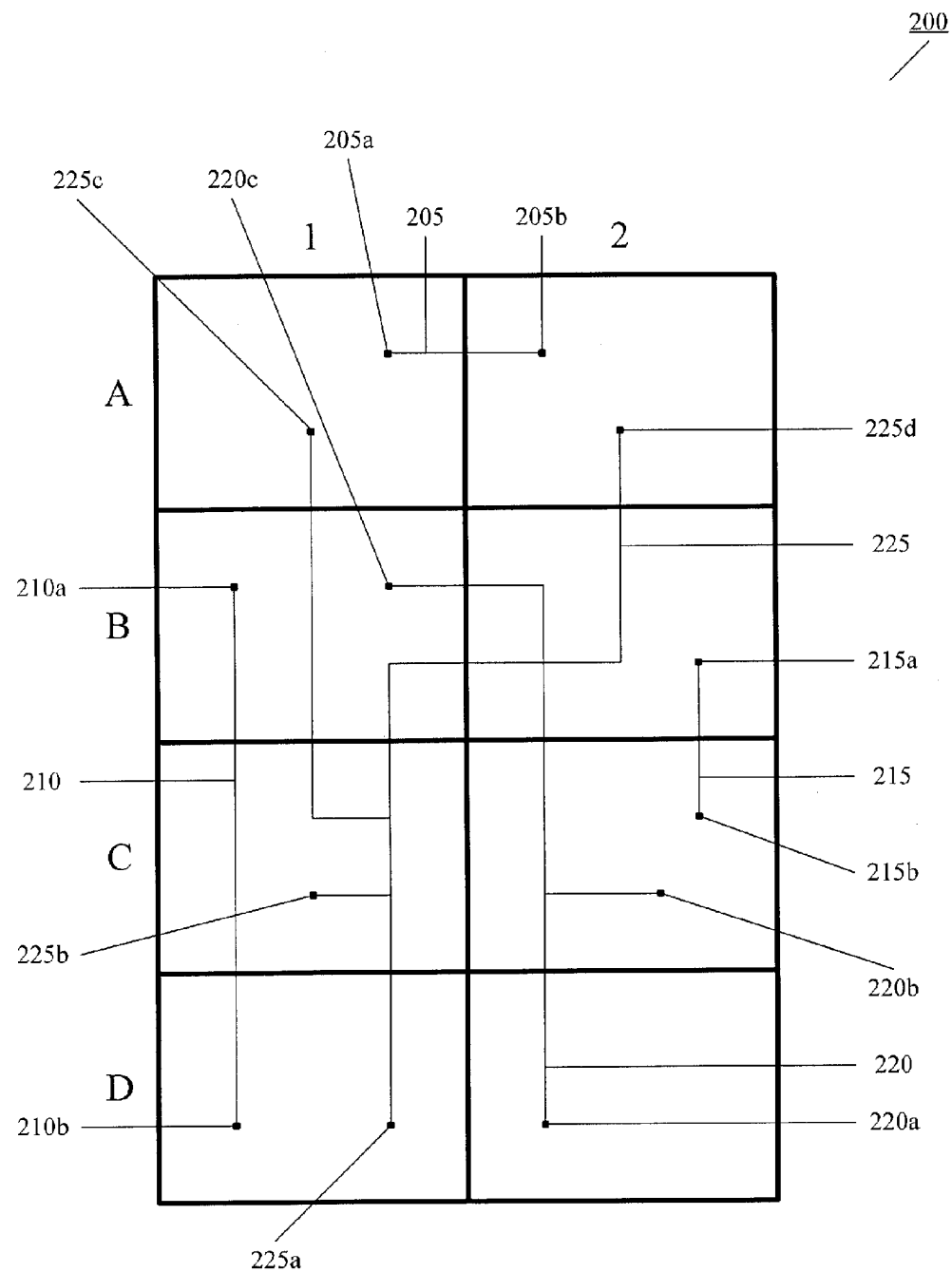
FIG. 2 shows a second system of wires according to an exemplary embodiment of the present invention.

FIG. 2 shows a second system 200 of wires according to an exemplary embodiment of the present invention. The second system 200 may also be any information technology system that includes a plurality of components in which a plurality of wires is disposed. Thus, the second system 200 may be substantially similar to the first system 100 of FIG. 1 (e.g., include similar components, wires may be intrasystem or intersystem, etc.).

The second system 200 may also be divided into a grid. The second system 200 includes a 4×2 grid with eight grid sections: A1, A2, B1, B2, C1, C2, D1, and D2. The second system 200 illustrates that the information technology system may be divided into any number of grid sections. That is, the first system 100 being divided into a grid with four sections is only exemplary. The second system 200 may also be another embodiment of the first system 100. That is, the second system 200 may be in a same room and would have identical dimensions. However, due to the configuration of wires and/or the resolution of the imaging device, the second system 200 has been divided into a grid with eight sections. Furthermore, the second system 200 may be used in conjunction with the first system 100. That is, the first system 100 may represent a first set of wires while the second system 200 represents a second set of wires. The same room will thus be divided into two separate grids.

The second system 200 further includes a plurality of wires 205-225. The wires 205-225 may be disposed in a substantially similar manner within the second system 200 as the wires 105-140 of the first system 100 (e.g., above the floor, under the floor, in cable trays, etc.). In contrast to the first system 100 which includes wires 105-140 having only a first and second end, the second system 200 includes wires 205-225 which may include more than a first and second end. The wires 205-215 may be substantially similar to the wires of the first system 100. That is, the wires 205-215 include first and second ends. Specifically, the wire 205 includes a first end 205*a* disposed in grid section A1 and a second end 205*b* disposed in grid section A2. The wire 210 includes a first end 210*a* disposed in grid section B1, a body of the wire 210 passing through grid section C1, and a second end 210*b* disposed in grid section D1. The wire 215 includes a first end 215*a* disposed in grid section B2 and a second end 215*b* disposed in grid section C2.

The wires 220-225 may also include additional connections. That is, the wires 220-225 may include more than only a first and second end. The wires 220-225 represent that the wires for the first system 100 and the second system 100 may connect one or more components of the system to one or more other components of the system (e.g., the wire may be a bundled wire with multiple conductors). As illustrated, the wire 220 includes a first end 220*a* disposed in grid section D2, a second end 220*b* disposed in grid section C2, a body of the wire 220 passing through grid section B2, and a third end 220*c* disposed in grid section B1. The wire 225 includes a first end 225*a* disposed in grid section D1, a second end 225*b* disposed in grid section C1, a body of the wire 225 passing through grid section B1, a third end 225*c* disposed in grid section A1, a body of the wire 225 passing through grid section B2, and a fourth end 225d disposed in grid section A2.

A virtual survey may be created for the second system 200 in a substantially similar manner as the virtual survey for the first system 100. That is, each grid section may be marked with a physical identifier such as a barcode. An image may be taken of each grid section that includes the wires disposed therein. Each wire of a grid section may be marked with an identifier such as a virtual tag. An opposing end of each wire may also be marked with an identifier. As discussed above, a common or different virtual tag may be used. With different virtual tags for ends of a single wire, the virtual tags may be associated with each other. It should be noted that the virtual survey may be created using the MU 500 of FIG. 5 described above.

Figure 3:
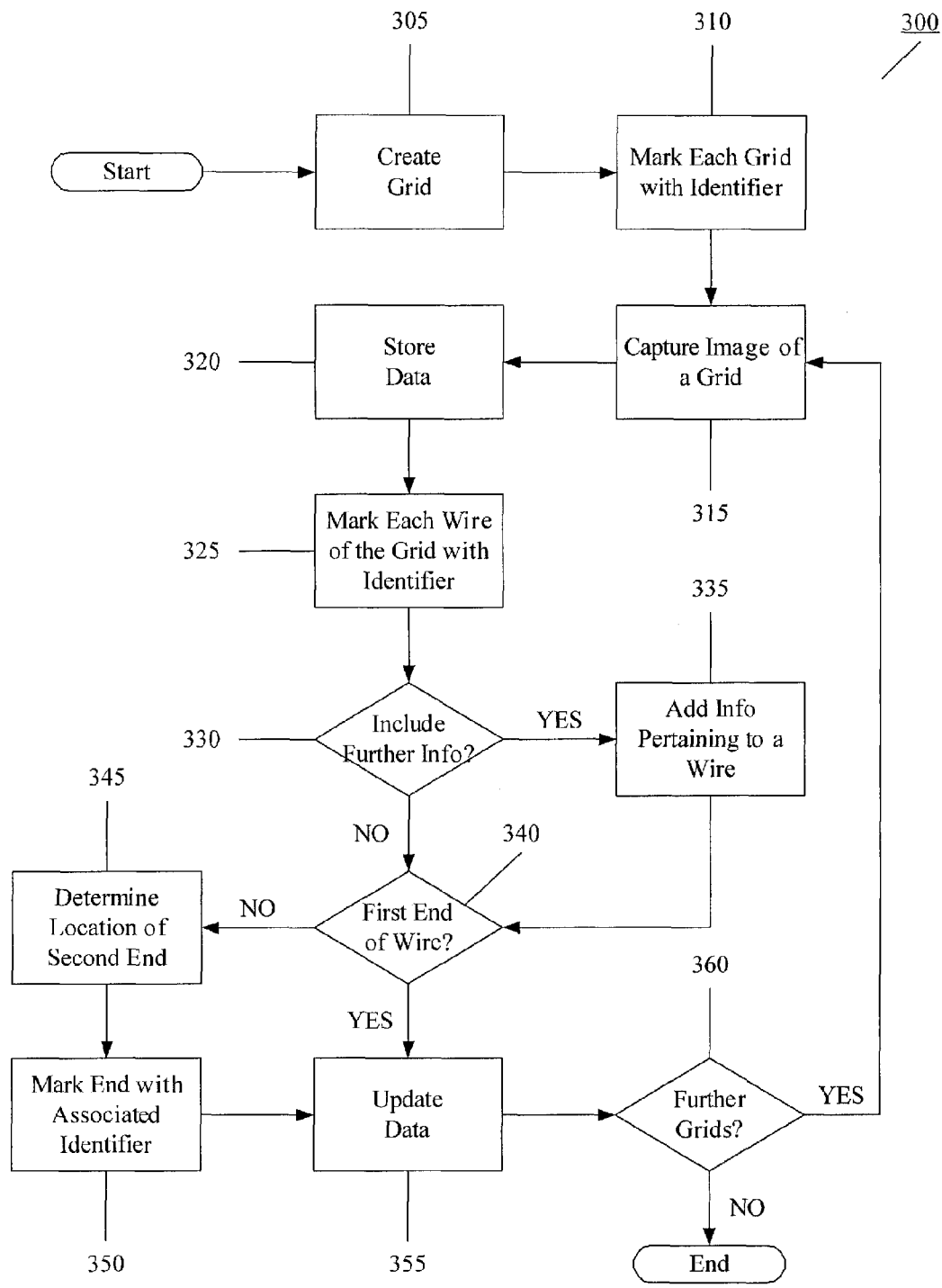
FIG. 3 shows a method of creating a virtual survey of a system of wires according to an exemplary embodiment of the present invention.

FIG. 3 shows a method 300 of creating a virtual survey of a system of wires according to an exemplary embodiment of the present invention. The method 300 will be described with reference to the first system 100 of FIG. 1 and the second system 200 of FIG. 2. The method 300 may be applied to either the first system 100 or the second system 200. The method 300 may be performed using the MU described above.

In step 305, a grid is created. As discussed above, the first system 100 or the second system 200 may be an information technology system disposed in an area. The area may be divided into a grid where the grid includes a plurality of sections. The grid sections may be arbitrarily created. For example, the grid sections may be determined by a component such as a server for the system. In another example, the grid sections may be determined by a percentage of a total area (e.g., 25% area grid sections for the first system 100, 12.5% area grid sections for the second system 200, etc.). In a further example, the size of the grid may be determined by the resolution of the image capturing device with respect to the density of the connectors (e.g., wires).

In step 310, each grid section is marked with an identifier. As discussed above, the identifier may be a barcode (e.g., one-dimensional, two-dimensional, color, etc.). The identifier may be disposed at any location within the grid section (e.g., at a center of the section, on a periphery of the section, etc.) or a representation of the grid so that an immediate recognition that the barcode relates to the grid section may be had.

In step 315, an image of each grid section is captured. The image may be captured using the data capturing device of the MU. The image may be a high-resolution image so that the wires contained in the grid section may be easily identified. The image may also be colored so that colored wires may be used to further aid in easily identifying the wires.

In step 320, the data is stored. The data may be stored on an individual memory of the MU, forwarded to a central database for storage, a combination thereof, etc. The data may include, for example, grid data. The grid data may include overall area data illustrating the area in which the system is disposed. Furthermore, the grid data may show how the area is divided into the grid. In addition, the grid data may include a list of identifiers that relate to each of the grid sections. In another example, the data may include the images of each grid section. The images may be associated with the respective identifier so that when the identifier for a grid section is read, the image for the grid section may be retrieved.

In step 325, each wire of a grid section is marked with an identifier. As discussed above, the identifier may be a virtual tag. It should be noted that after an image of each grid section is taken and stored, the image of a grid may be required to be loaded and shown on the display of the MU so that each wire may be marked. As discussed above, the display may include a digitizer so that a user may touch a wire shown on the display and mark it with the identifier. In another embodiment, a pointing device and keypad may be used to mark the wire with the identifier. In a further exemplary embodiment, a process executing on the MU 500 may identify each wire in the image automatically and prompt the user to enter information for the wire.

In step 330, a determination is made whether to include further information. If further information is to be added, the method 300 continues to step 335 where the further information is added. The further information may be created in a new file that is attached to the image of the grid section, be part of the image file itself, etc. The further information may pertain to the grid sections, the wires of each grid section, etc. For example, the further information may indicate a purpose for a wire such as connecting a server to a switch.

Whether further information was added or not added, the method 300 continues to step 340. In step 340, a determination is made whether the marked end of the wire is a first end. That is, the determination indicates whether the wire includes an end that has another end that has been marked.

If step 340 determines that the marked end of the wire is not the first end, the method 300 continues to step 345. In step 345, a location of a second end of the wire is determined. It should be noted that if the marked end of the wire is not the first end, it is assumed that the other end of the wire has already been marked and saved with data of a grid section. It should also be noted that since the wire may be wholly disposed within a single grid section, the other end of the wire may have been marked with the current image of the grid section. The second end of the wire may be located using data that has already been saved. Thus, a cross reference of the data may indicate the location of the second end. It should be noted that a first iteration of the method 300 (i.e., first grid section to be surveyed) will automatically lead to step 355.

It should be noted that the wire may include additional ends beyond the first and second ends as was illustrated with wires 220 and 225 of the second system 200 of FIG. 2. Thus, the method 300 may include additional steps to address the additional ends of the wire. For example, between steps 340 and 345, a determination may be made whether the wire includes multiple ends to the marked end. If the wire only includes a first and second end, then the method 300 continues to step 345. If the wire includes more than a first and second end, then the method continues to a step where a location of each end is determined.

In step 350, the end appearing on the display of the grid section is marked with an associated identifier. It should be noted that this step assumes that another end of the wire has already been marked with an identifier. Thus, step 350 may be used to create a virtual tag that is associated with the virtual tag of the other end that has already been marked. As discussed above, the associated identifier may be an identical virtual, a different virtual tag that is associated, etc.

In step 355, the data is updated. The updated data may entail storing the images of the grid sections with additional data pertaining to the wires. The additional data may also relate to the associations between identifiers of the wire ends. The additional data may further relate to the locations of the additional ends for the wire containing the marked end on the image of the grid section being displayed.

In step 360, a determination is made whether further grids exist. That is, the method 300 iterates so that a complete survey may be made of the entire area of the system. Thus, if further grids exist, the method 300 returns to step 315 where an image of another grid section is taken. It should be noted that if the iteration of the method 300 is for a final grid section, then the method 300 will end.

Figure 4:
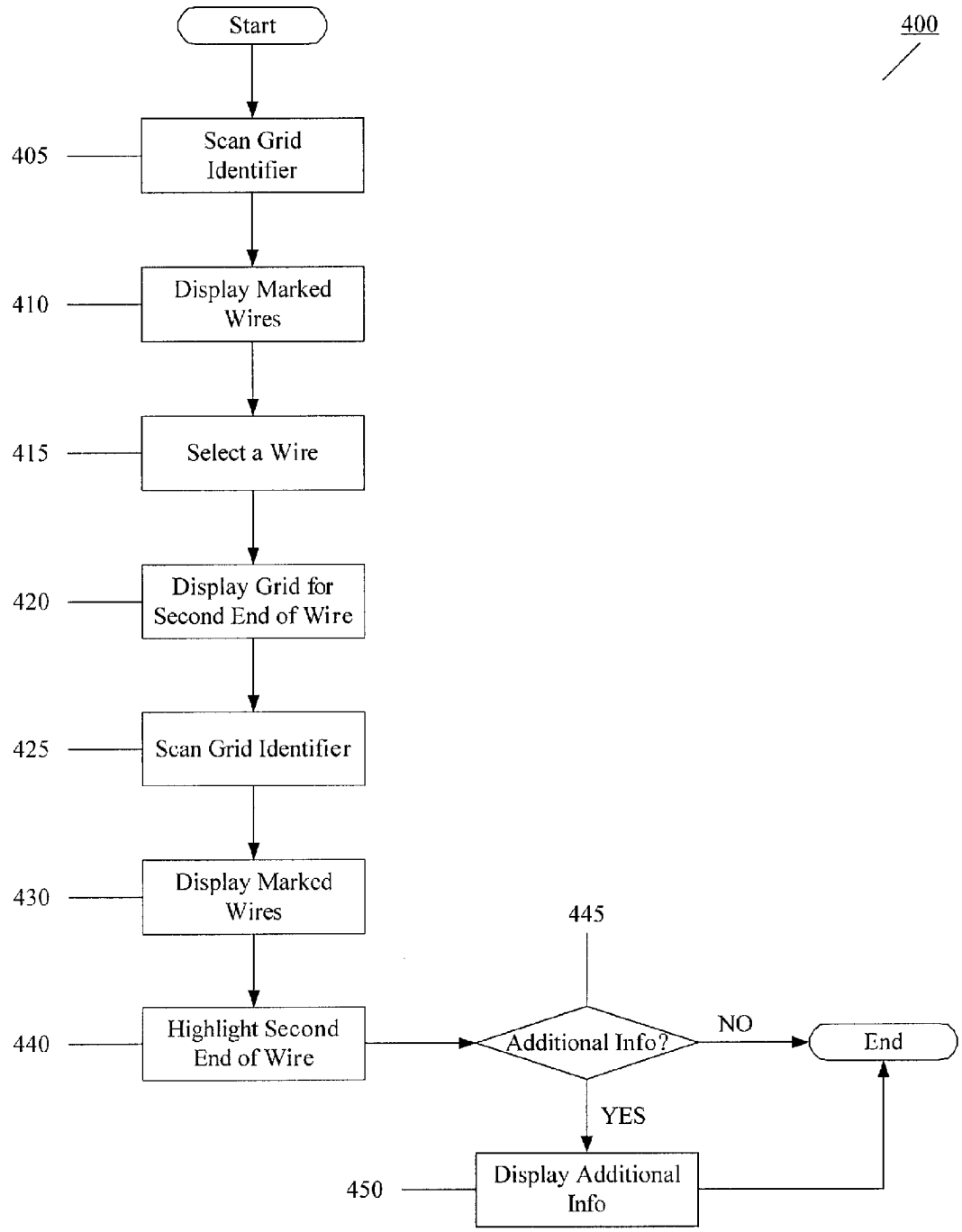
FIG. 4 shows a method of utilizing the virtual survey created by the method of FIG. 3 according to an exemplary embodiment of the present invention.

FIG. 4 shows a method 400 of utilizing the virtual survey created by the method 300 of FIG. 3 according to an exemplary embodiment of the present invention. Specifically, the method 400 relates to a time frame after a complete survey of a system has been made. Furthermore, the method 400 relates to when a first end and a second end of a wire is required to be located such as for troubleshooting matters. The method 400 will be described with reference to the first system 100 of FIG. 1, the second system 200 of FIG. 2, and the method 300 of FIG. 3. The method 400 may be applied to the first system 100 and the second system 200.

In step 405, an identifier for a grid section is scanned. As discussed above, each grid section may be marked with a physical identifier such as a barcode. Thus, using the data capturing device such as a scanner of the MU 500, the identifier for the grid section is scanned. It should be noted that it may be assumed that a user (e.g., troubleshooter) is located at the grid section in which the identifier is disposed. For example, the user may be located in grid section A1 of the first system 100.

In step 410, the image of the grid section including the marked wires is displayed. The association between the grid section and the identifier may be stored as part of the grid data discussed above. For example, since the user is located in grid section A1, the marked wires may include wires 105, 110, 115, 120, and 125. The marked wires may further indicate a corresponding virtual tag.

In step 415, a wire in the image of the grid section is selected. The selection of the wire may be performed in a variety of manners. For example, the digitizer of the display may be used so a user touches a virtual tag or wire on the image. In another example, the pointing device and the keypad may be used to select a wire. In yet another example, a list may be presented including the wires of the grid section. The user may select the wire from the list. For example, the user may select wire 105.

In step 420, a grid section for a second end of the wire is displayed. In a first embodiment, the MU 500 may display an entire area of the system. Furthermore, the image may show the different grid sections for the area. To indicate the grid section for the second end of the wire, the grid section in which the second end is disposed may be highlighted (e.g., border of grid section blinks). In a second embodiment, the MU 500 may display an entire area of the system with the grid sections. The grid section in which the second end is disposed may be shown as text to the user. For example, the display of the MU 500 may indicate that the second end 105b of the wire 105 is located in grid section A2.

In step 425, a grid section identifier in which the second end of the wire is disposed is scanned. Using the data capturing device of the MU 500, the identifier (e.g., barcode) may be scanned so that an image of the grid section may be displayed. It should be noted that it may be assumed that the user is located at the grid section in which the identifier for the grid section in which the second end of the wire is disposed. For example, the user may be in grid section A2 and scanned the grid identifier for grid section A2.

In step 430, marked wires for the grid section in which the second end of the wire is disposed is displayed. It should again be noted that upon scanning the grid identifier, an image of the grid section may be shown on the display of the MU 500. For example, because the user is in grid section A2, the image of the grid section A2 may show the wires 105, 110, 130, and 135. In step 435, the second end of the selected wire is highlighted.

In step 445, a determination is made whether any additional information about the selected wire exists. If any additional information about the selected wire exists, the method 400 continues to step 450. In step 450, the additional information is displayed. For example, the additional information may indicate that the wire 105 connects a server disposed in grid section A1 to a database disposed in grid section A2.

Steps 445 and 450 may be performed at other locations of the method 400. For example, if additional information exists for the selected wire, step 450 may be performed after step 415. The additional information may assist the user in determining if the selected wire is correct for the purpose that user wishes.

The method 400 may include further steps to incorporate embodiments where a wire includes more than a first and second end. For example, the user may be in grid section D2 of the second system 200. The user may scan the grid identifier for grid section D2 (step 405). Upon displaying the marked wires for grid section D2 (step 410), the user may select wire 220 (step 415). The MU may indicate that the wire 220 includes two additional ends to the first end 220a. In this embodiment, the additional information pertaining to the wire 220 may be more pertinent. Thus, step 450 may be performed at this juncture of the method 400. When the appropriate end of the wire 220 is determined such as the third end 220c, the grid section in which the third end 220c is disposed is displayed (step 420). The remaining steps of the method 400 may then be performed in a substantially similar manner as discussed above.

Furthermore, the method 400 may be used for selecting a wire that is only passing through a grid section. For example, the wire 125 includes the first end 125a disposed in grid section A1 and the second end 125b disposed in grid section B2. The wire 125 also passes through grid section B1. Thus, in an image of grid section B1, the wire 125 may include a virtual tag. The virtual tag may be associated with virtual tags corresponding to the first end 125a and the second end 125b. When a user scans the identifier for the grid section B1, the image for grid section B1 is shown. The user may select wire 125. The method 400 may indicate that the wire 125 includes two ends where the first end 125a is in grid section A1 and the second end 125b is in grid section B2. The additional information may be used and the appropriate grid section may be chosen.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A computer-implemented method of identifying connecting components in a room, comprising;
    dividing the room into a plurality of grid sections;
    capturing an image of each of the plurality of grid sections, the image of each of the grid sections including at least one connector disposed therein, the at least one connector having a first end that connects to a first component located in a first one of the grid sections and a second end that connects to a second component located in a second one of the grid sections;
    displaying a first virtual identifier in the image of the first grid section for the first end of the connector; and displaying a second virtual identifier in the image of the second grid section for the second end of the connector.

2. The method of claim 1, wherein each of the grid sections includes a grid identifier.

3. The method of claim 2, further comprising:
storing a relationship between the first and second virtual identifiers;
receiving a selection of one of the first and second virtual identifiers; and
displaying one of the image including the other one of the first and second virtual identifiers and the grid identifier of the grid section including the other one of the first and second virtual identifiers.

4. The method of claim 2, wherein the grid identifier is a barcode.

5. The method of claim 1, wherein the first and second grid sections are the same grid section.

6. The method of claim 1, wherein the first and second virtual identifiers are the same identifier.

7. The method of claim 1, wherein the connector is one of a data cable, a power cable, and a pipe.

8. The method of claim 1, wherein the first and second virtual identifiers comprise virtual tags.

9. The method of claim 1, further comprising:
storing additional information relating to the at least one connector.

10. The method of claim 9, wherein the additional information includes at least one of a purpose, a location, a length, and a color.

11. A device for identifying connecting components in a room, comprising:
a user interface for dividing the room into a plurality of grid sections;
a data capturing component capturing an image of each of the plurality of grid sections, the image of each grid section including at least one connector disposed therein, the at least one connector having a first end that connects to a first component located in a first one of the grid sections and a second end that connects to a second component located in a second one of the grid sections;
a display displaying the image of the first grid section with a first virtual identifier for the first end and displaying the image of the second grid section with a second virtual identifier;
a data input arrangement receiving the first virtual identifier in the image of the first grid section for the first end of the connector and receiving the second virtual identifier in the image of the second grid section for the second end of the connector; and
a memory storing each of the images and the first and second virtual identifiers.

12. The device of claim 11, wherein the first virtual identifier is selectable, the display displaying a grid identifier of the second grid section including the second end in response to a selection of the first virtual identifier.

13. The device of claim 11, wherein the data capturing component further captures a grid identifier for each of the grid sections.

14. The device of claim 11, wherein the data capturing device includes at least one of a barcode scanner, an imager, and a camera.

15. The device of claim 11, wherein the data input arrangement is a digitizer on the display.

16. The device of claim 11, wherein the data input arrangement includes at least one of a keypad, a pointing device, and a stylus.

17. The device of claim 11, wherein the display is a high resolution flat panel display.

* * * * *

UNITED STATES PATENT AND TRADEMARK OFFICE
CERTIFICATE OF CORRECTION

PATENT NO. : 8,266,532 B2
APPLICATION NO. : 11/863983
DATED : September 11, 2012
INVENTOR(S) : Gurevich et al.

It is certified that error appears in the above-identified patent and that said Letters Patent is hereby corrected as shown below:

In Column 3, Line 13, delete "11b." and insert -- 110b. --, therefor.

In Column 10, Line 57, in Claim 1, delete "comprising;" and insert -- comprising: --, therefor.

Signed and Sealed this
Twelfth Day of February, 2013

Teresa Stanek Rea
*Acting Director of the United States Patent and Trademark Office*